(12) United States Patent
Almgren et al.

(10) Patent No.: US 8,380,525 B2
(45) Date of Patent: Feb. 19, 2013

(54) CONTINUED TELECOMMUNICATION WITH WEAK LINKS

(75) Inventors: Magnus Almgren, Sollentuna (SE);
Stefan Bruhn, Sollentuna (SE); Per Skillermark, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 656 days.

(21) Appl. No.: 12/666,203

(22) PCT Filed: Jun. 25, 2007

(86) PCT No.: PCT/SE2007/000619
§ 371 (c)(1),
(2), (4) Date: Jan. 19, 2010

(87) PCT Pub. No.: WO2009/002232
PCT Pub. Date: Dec. 31, 2008

(65) Prior Publication Data
US 2010/0324918 A1    Dec. 23, 2010

(51) Int. Cl.
*G10L 21/00* (2006.01)
(52) U.S. Cl. ... 704/500; 704/200; 455/63.1; 375/240.27
(58) Field of Classification Search ............. 704/200, 704/500; 455/63.1; 375/240.27
See application file for complete search history.

(56) References Cited

U.S. PATENT DOCUMENTS

| | | | |
|---|---|---|---|
| 5,812,968 A * | 9/1998 | Hassan et al. | 704/221 |
| 6,466,551 B2 * | 10/2002 | Sakai et al. | 370/296 |
| 6,738,359 B1 | 5/2004 | Watanabe | |
| 7,606,543 B1 * | 10/2009 | Seppanen | 455/226.2 |
| 2004/0184461 A1 | 9/2004 | Forssell et al. | |
| 2005/0213518 A1 | 9/2005 | Ahya et al. | |
| 2006/0153110 A1 | 7/2006 | Morgan et al. | |
| 2009/0044232 A1 * | 2/2009 | Narahari et al. | 725/62 |

FOREIGN PATENT DOCUMENTS

| | | |
|---|---|---|
| EP | 1715648 A2 | 10/2006 |
| JP | 2000102066 | 4/2000 |
| WO | 96/13914 | 5/1996 |
| WO | 2005/029903 A1 | 3/2005 |

* cited by examiner

*Primary Examiner* — Daniel D Abebe
(74) *Attorney, Agent, or Firm* — Coats & Bennett, P.L.L.C.

(57) ABSTRACT

According to the invention a receiving end terminal (RET) enters a delay mode based on the detecting of the quality of the link being lower than a threshold. In this delay mode, the receiving end terminal provides a reception delay indicator (RDI) for a sending end terminal (SET). The sending end terminal (SET) receives the reception delay indicator (RDI) and provides an end of speech indicator (ESI) for the receiving end terminal (RET) at an end of a speech coding interval (SC). The receiving end terminal (RET) uses the reception delay indicator (RDI) and end of speech indicator (ESI) to define a first time interval (AL1) during which a speech decoder is disabled. The speech decoder is again activated after the first time interval (AL1).

23 Claims, 4 Drawing Sheets

CONTINUED TELECOMMUNICATION WITH WEAK LINKS

TECHNICAL FIELD OF THE INVENTION

The present invention relates to the field of telecommunication and especially telecommunication when communication links have low quality. More particularly the present invention relates to methods and devices for continuing communication between a first and a second communication terminal normally engaged in duplex communication when the link between the two communication terminals is weak.

DESCRIPTION OF RELATED ART

Voice communication between end terminals via a network can be the subject of degradation of the communications link. This is especially the case for wireless networks. With such voice communication, voice coders are normally used.

Today there exist voice coders that support different voice qualities and data rates. In wireless communication network, the rate of the voice coder can be adapted based on e.g. the strength of the radio link or the load in the network. To support users communicating over weak radio links, a low rate (and hence a relatively low voice quality can be chosen. Similarly, in highly loaded networks one may decide to lower the rate of some voice users, and hence reduce the quality, in order to support a higher number of users in total.

The lowest rate of the voice coder is typically selected as the rate that may offer acceptable real-time voice quality. When the channel quality is low some information might be lost due to the weak radio channel. The delay is however limited to a fraction of seconds.

There are limits however. If the channel is far too weak, then regular full-duplex voice communication even at the lowest coder rate cannot be supported and connections are dropped by the network or are never admitted. This is annoying especially for users with ongoing calls whose link quality degrades over time and that are dropped by the network without prior notice. No alternative communication service is offered by the network instead of the real-time voice service that is no longer available.

In the prior art various solutions are proposed for degraded link qualities. One common approach is to inform the users of the bad link, and then these users essentially have to terminate the connection or risk loosing it altogether. This approach is for instance described in US2006/0109825, US2006/0068731, U.S. Pat. No. 6,330,438 and U.S. Pat. No. 7,076,245.

Other approaches are directed towards how to handle the situation when a connection has actually been lost. Solutions in this area are described in U.S. Pat. No. 7,072,641 and U.S. Pat. No. 6,246,872.

U.S. Pat. No. 6,381,455 describes a solution where the frame rate is reduced and error correction codes are added when the link quality is weak.

The known solutions addressing the above-mentioned problem are not satisfactory. There is therefore a need for a solution allowing continued communication when the link quality is too weak for regular conversation speech service.

SUMMARY OF THE INVENTION

The present invention is directed towards allowing continued communication between communication terminals in cases of poor link quality.

One object of the present invention is thus to provide a method for allowing a receiving end terminal to continue communication with a sending end terminal, when the link between the two terminals is weak.

This object is according to a first aspect of the present invention achieved through a method for continuing communication between a first and a second communication terminal normally engaged in duplex communication, when the link between the two communication terminals is weak, comprising the steps of:
entering a delay mode involving simplex communication based on the detecting of the quality of the link being lower than a first threshold, and
providing an indication for a user of the first communication terminal acting as a receiving end terminal of the delay mode.

Another object of the present invention is to provide a device for allowing a receiving end terminal to continue communication with a sending end terminal, when the link between the two terminals is weak.

This object is according to a second aspect of the present invention achieved through a device for continuing communication between a first and a second communication terminal normally engaged in duplex communication, when the link between the two communication terminals is weak, and comprising:
a network interface associated with a communication network, and
a communication mode control unit arranged to
  enter a delay mode involving simplex communication based on the detecting of the quality of the link being lower than a first threshold, and
  provide an indication for the user of the first communication terminal acting as a receiving end terminal of the delay mode.

Another object of the present invention is to provide a method for allowing a sending end terminal to continue communication with a receiving end terminal, when the link between the two terminals is weak.

This object is according to a third aspect of the present invention achieved through a method for continuing communication between a first and a second communication terminal normally engaged in duplex communication, when the link between the two communication terminals is weak and comprising the steps of:
entering a delay mode involving simplex communication based on the detecting of the quality of the link being lower than a first threshold, and
providing an indication for a user of the second communication terminal acting as a sending end terminal of the delay mode.

Yet another object of the present invention is to provide a device for allowing a sending end terminal to continue communication with a receiving end terminal, when the link between the two terminals is weak.

This object is according to a fourth aspect of the present invention achieved through a device for continuing communication between a first and a second communication terminal normally engaged in duplex communication, when the link between the two communication terminals is weak and comprising:
a network interface associated with a communication network, and
a communication mode control unit arranged to
  enter a delay mode involving simplex communication based on the detecting of the quality of the link being lower than a first threshold, and provide an indication for a user of the second communication terminal acting as a sending end terminal of the delay mode.

A weak link is here a link over which conversational speech services cannot be supported. This can be because a sending end terminal needs to transfer data at a rate that is higher than the link is capable of supporting and/or that a receiving end terminal needs to receive data at a rate that is higher than the link is capable of supporting.

The present invention has a number of advantages. With the present invention it is possible to continue communication between two end terminals even though the link between them is weak. This is according to one variation of the present invention solved through stopping real-time communication and instead buffering up speech packets. In this way users are allowed to speak in turns, while retaining the connection. This has the advantage of allowing the end users to decide if a communication session is to be ended when the link is weak as opposed to being forced by a network. Another advantage is that since speech packets are buffered, it is possible to provide improved processing of the speech so that there are no errors. This is often not possible in a real-time communication.

It should be emphasized that the term "comprises/comprising" when used in this specification is taken to specify the presence of stated features, steps or components, but does not preclude the presence or addition of one or more other features, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

The present invention is directed towards allowing a voice communication session to continue between two communication terminals in case the link between them is weak.

Figure 1:
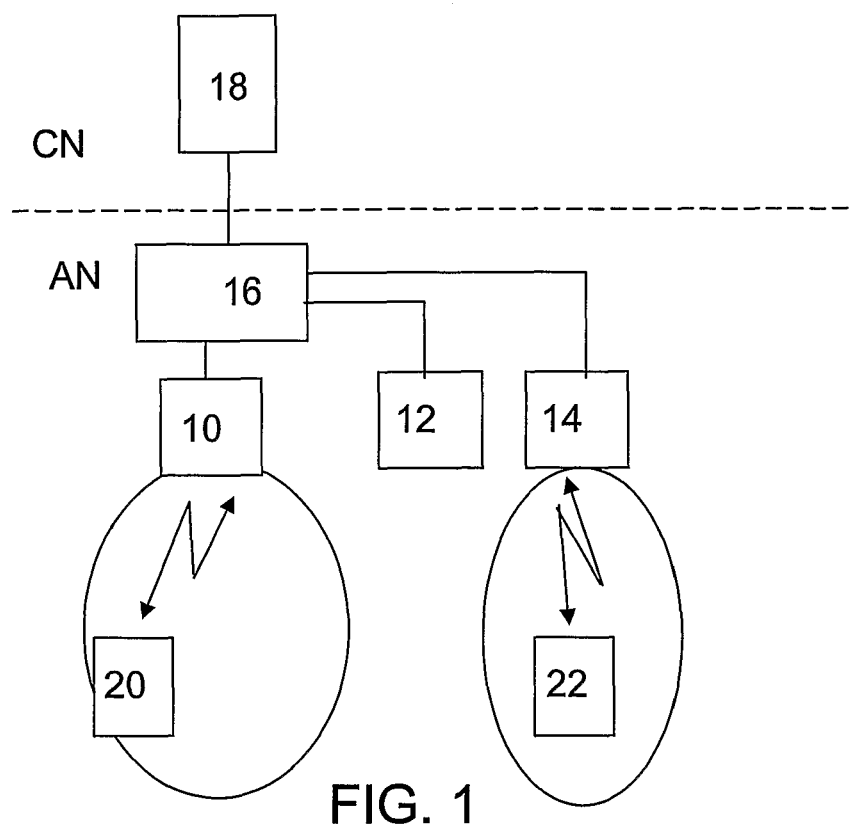
FIG. 1 schematically shows an access network connected to a core network as well as two mobile stations connected to two different base stations of the access network.

The present invention will now be described in more detail in the non-limiting example context of a wireless wide area network, which is here a Universal Mobile Telecommunications (UMTS) network that is shown in FIG. 1. However it should be realised that the invention may be applied in other types of wireless networks such as LTE (Long Term Evolution) networks or WLAN networks. The invention is in fact not limited to wireless networks, but can be applied in any type of communication network like a computer network. In the UMTS network of FIG. 1, there is a core network section CN that has a first service node 18, which may be a General Packet Radio Service (GPRS) node tailored to provide packet-switched type services, which is sometimes referred to as the serving GPRS service node (SGSN). The node 18 may be connected to connectionless-oriented networks such as the Internet. It should here be realised that the core network CN may include other types of service nodes, such as a circuit-switched type of service node. However, additional service nodes have here been omitted for the sake of clarity.

The core network service node 18 connects to an access network section AN, which is here a UMTS Terrestrial Radio Access Network (UTRAN). UTRAN AN includes one or more radio network controllers (RNC), where only one RNC 16 is shown in FIG. 1. The RNC 16 is connected to a plurality of base stations. The RNC 16 is connected to a first base station 10, a second base station 12 and a third base station 14. Each of these base stations 10, 12 and 14 control communication within a cell. Here it should be realised that one base station may handle more than one cell. In the figure only two cells are shown, one associated with the first base station 10 and one associated with the third base station 14. Also this for the sake of clarity the cells are provided in a geographical area covered by the access network AN. In FIG. 1 communication terminals in the form of a first and a second mobile station 20 and 22 are shown, where the first mobile station 20 is communicating with the second mobile station 22 via the first base station 10 and the third base station 14. It should be realised that normally there may be provided several mobile stations communicating through a base station. Here only two are shown in order to describe the present invention. It should furthermore be realised that the two mobile stations 20 and 22 need not be communicating with each other via the same RNC 16, but that they may be provided far from each other. One may even be provided in another network. For this reason it should therefore be realised that FIG. 1 is only provided in order to give a general understanding of the functioning of the present invention. The nature of the communication will shortly be described in more detail.

The mobile stations 20 and 22 are with advantage cellular phones. One such phone that is applicable for describing both the first and second mobile station 20 and 22 is shown in a front view in FIG. 2 and provided with reference numeral 20. The cellular phone 20 is normally provided with a display 26 and a keypad 24 including a number of keys. The phone 20 also includes a speaker 28 and a microphone 30. These entities together make up a user interface of the cellular phone 10. The keypad 24 is used for entering information such as selecting of functions and responding to prompts and the display 26 is used for displaying functions and prompts to a user of the phone. A cellular phone is just one example of a communication device for which the invention can be implemented. The invention can for instance also be used in other devices, such as in a PDA (personal digital assistant), a palm top computer, a lap top computer or even in a PC (Personal Computer).

Figure 2:
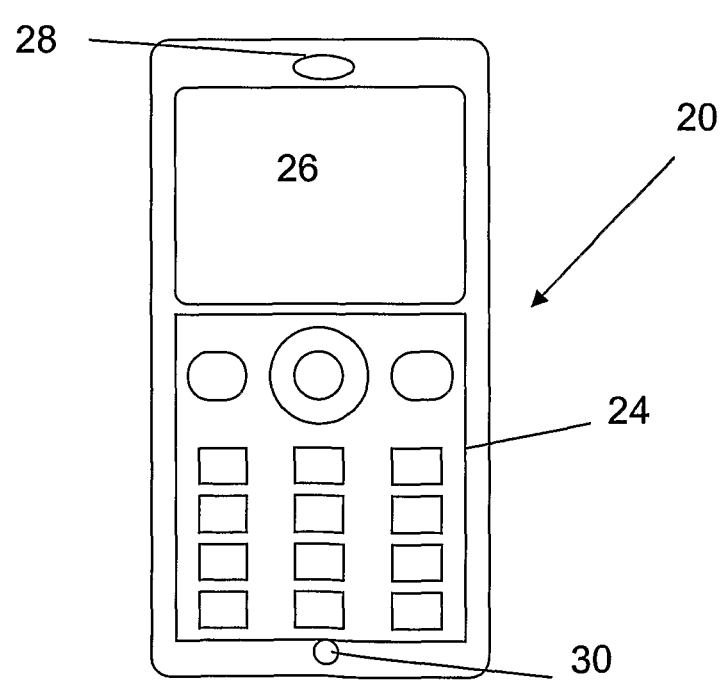
FIG. 2 shows a front view of a communication terminal according to the present invention in the form of a mobile station.
Figure 3:
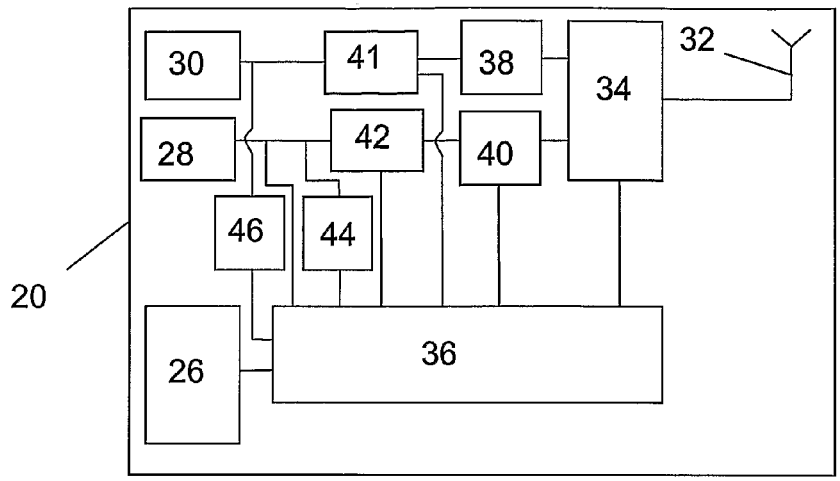
FIG. 3 shows a block schematic of the relevant parts of a communication terminal for providing the present invention.

FIG. 3 shows a block schematic of the first cellular phone, 20 and a number of units that are relevant for the present invention. As mentioned above this block schematic is applicable also for describing the second cellular phone 22. The keypad of FIG. 2 is not used in any large extent in the present invention. Therefore it has been omitted in FIG. 3. The phone 20 includes the above described display 26, which is connected to a communication mode control unit 36. The communication mode control unit 36 is in turn connected to a network communication unit 34. The network communication unit 34 is in turn connected to an antenna 32 for communicating over the wireless wide area network. The communication unit 34 and antenna 32 together make up a network interface of the phone 20 for interfacing with the communication network of FIG. 1. The communication unit 34 normally includes such functionality as a modulating and demodulating unit as well as power amplifying units. The communication unit 34 is in turn connected to a sending buffer 38 and to a receiving buffer 40. Both these buffers are preferably FIFO buffers. The sending buffer 38 is connected to a speech coder 41, while the receiving buffer 40 is connected to a speech decoder 42, and the receiving buffer 40 is also connected to the communication mode control unit 36. The speech coder 41 includes functionality for coding speech and is in turn connected to the microphone 30, while the speech decoder 41 includes functionality for decoding speech and is in turn connected to the speaker 28. Also the communication mode control unit 36 is connected to the speaker 28 as well as to the speech coder 41 and the speech decoder 42. Finally there is provided a voice detecting unit 46 connected between the microphone 30 and the communication mode control unit 36 and a recording unit 44 connected between the speaker 28 and the communication mode control unit 36. The voice detecting unit 46 is here preferably provided with a voice activity detector (VAD). As mentioned above the speech coder is responsible for coding speech, while the speech decoder is responsible for decoding speech. Other types of coding, like channel coding, are not performed by these units. Channel coding is for instance performed by the communication unit 34.

Now the functioning of the two phones 20 and 22 in a normal communication situation will be described in relation to previously described FIG. 1-3.

It all starts with a phone session going on between the two phones 20 and 22. In such a session, both these phones are end terminals that both receive and transmit voice to and from each other. The phones are thus engaged in duplex communication. In normal operation both the end terminals thus simultaneously act as sending and receiving end terminals. The rate at which data is exchanged is here normally about 5-24 kbit/s. A sending end terminal would then receive voice signals from the microphone 30, which signals are coded and the coded voice data is packed into frames. This coding and packing is here performed by the speech coder 41. The output frames are then placed in the output buffer 38 and the frames are thereafter sent to the receiving end terminal using the communication unit 34 and antenna 32, i.e. using the network interface. The frames here have a known length, which may be 20 ms. Here the frames are modulated onto a carrier by the communication unit 34. A signal carrying the modulated frames is then received by the antenna 32 of the receiving end terminal and forwarded to the communication unit 34 of the receiving end terminal. The communication unit 34 demodulates the signal, retrieves the frames and provides the speech data in them to the receiving buffer 40. The speech decoder 42 thereafter fetches the speech data from the buffer 40, performs decoding and emits sounds, which are being output via the speaker 28.

This is thus the normal mode of operation which is being performed by both the communication terminals. It is here also assumed that the coder is coding speech at the lowest coding rate and the decoder is decoding speech at the lowest coding rate. Now the functioning of the present invention will be described for a receiving end terminal, which is here exemplified by the first phone 20 with reference being made also to FIG. 4, which shows a flow chart of a number of method steps taken in a method according to the present invention for continuing communication between a sending and a receiving end terminal and being performed in a receiving end terminal. The communication mode control unit 36 of the first phone is continuously monitoring the receiving buffer 40 in order to detect if the link quality is weak, step 48. As an example given here, this may be done through detecting that there is a delay between received frames. This means that the frames are received at a time interval that is greater than the one they are being transmitted at. It should be realised that other ways may be used in order to determine a weak link, such as transmission delay, bit error rate, number of re-transmissions, signal strength etc. In the case of delay, the weak link quality can easily be determined through the communication mode control unit 36 investigating the rate of decrease of data in the receiving buffer 40. This link quality is compared with a first threshold T1 and with a second threshold T2, where the second threshold T2 corresponds to a higher link quality than the first threshold T1. In the example with delay, T1 corresponds to a longer delay than T2. Thus, the communication mode control unit 36 first investigates if the link quality is below the second threshold, step 50, and if it is not, normal mode is continued, step 52, while if it is below the second threshold T2, a further investigation is made. The further investigation is directed towards determining if the link quality is below the first threshold T1. If the link quality is not below the first threshold, step 54, a stretch mode is entered, step 56. In this stretch mode the communication mode control unit 36 orders the speech decoder 42 to slow down the playing of the voice in the received frames using stretching and compression of the speech signal, i.e. through modifying the time scale. If however the link quality is below also the first threshold T1, step 54, a delay mode is entered, step 58. This mode will be described shortly. After the modes have been entered or retained, the communication mode control unit 36 goes back and again determines the link quality, step 48, and compares this link quality with the first and second thresholds, step 50 and 54, in order to determine if a mode change is necessary or not. In this way the communication mode control unit 36 of the receiving end terminal continuously monitors the link quality in order to determine if the link used is a weak link. This investigation furthermore continues as long as the communication session is ongoing.

A weak link is here a link over which conversational speech services cannot be supported. This can be because a sending end terminal needs to transfer data at a rate that is higher than the link is capable of supporting and/or that a receiving end terminal needs to receive data at a rate that is higher than the link is capable of supporting. Here it should also be mentioned that the delay mode may not be possible to leave while all necessary steps in it have been performed, whereas the stretch and normal modes may be left instantaneously when the conditions allow or require it.

Figure 4:
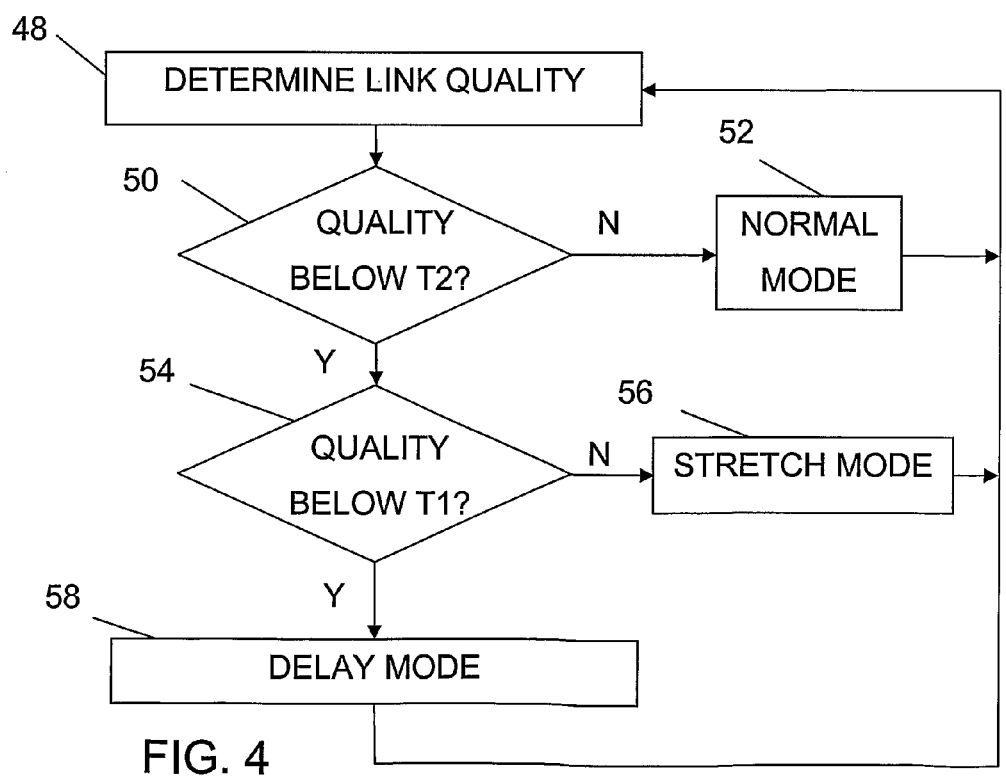
FIG. 4 shows a flow chart of a number of method steps taken in a method according to the present invention for continuing communication between a sending and a receiving end terminal and being performed in a receiving end terminal.
Figure 5:
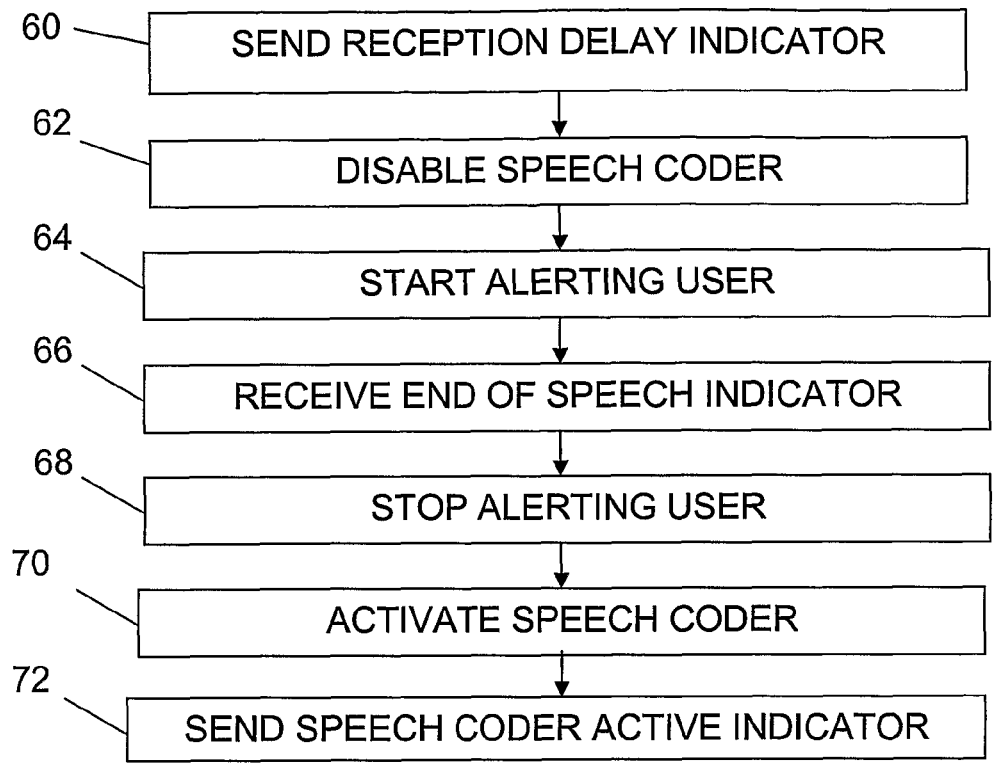
FIG. 5 shows a flow chart of a number of method steps taken in a delay mode selected in the flow chart of FIG. 4.

The delay mode, which involves simplex communication, will now be described in more detail with reference being made also to FIG. 5, which shows a flow chart of a number of method steps taken in the delay mode selected in the flow chart of FIG. 4 as well as to FIG. 7, which schematically shows speech being received from one user at a sending end terminal and played for a user of a receiving end terminal together with different indicators sent between these end terminals and to FIG. 8, which schematically shows data transferred between a sending and a receiving end terminal together with channel or link over which said data is transferred.

Figure 7:
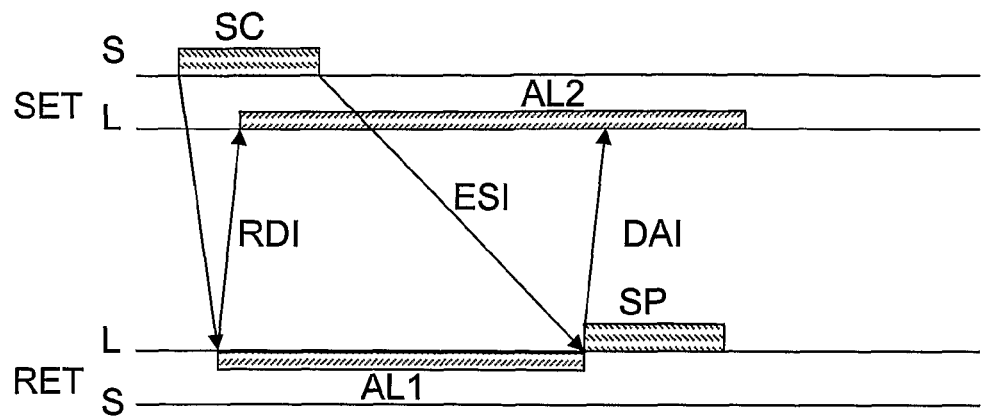

In FIG. 7 there is shown four straight time lines denoted S, L, L, and S, where two upper lines S and L are associated with the sending end terminal SET and two bottom lines L and S are associated with the receiving end terminal. Here L denotes listening and S denotes speaking. Information on lines denoted S thus indicates speech by a user of the corresponding end terminal and information on lines L indicates that sound is output to the user of the corresponding end terminal, i.e. the user listens. On the line S of the sending end terminal SET there is a box SC, indicating a speech coding interval during which speech is input by the user of the sending end terminal SET and on the line L of the receiving end terminal RET there is a box SP, indicating that the above mentioned speech is output to the user of the receiving end terminal RET. In relation to the line L of the receiving end terminal RET there is a box denoted AL1, which indicates a first time interval AL1 during which an alerting signal is output to the user of the receiving end terminal RET. On the line L of the sending end terminal SET there is a box denoted AL2, which indicates a second time interval AL2, during which an alerting signal is output to the user of the sending end terminal SET. In the drawing there is finally shown a reception delay indicator RDI and a speech coder active indicator CAI sent from the receiving end terminal RET to the sending end terminal SET as well as an end of speech indicator ESI sent from the sending end terminal SET to the receiving end terminal RET.

Figure 8:
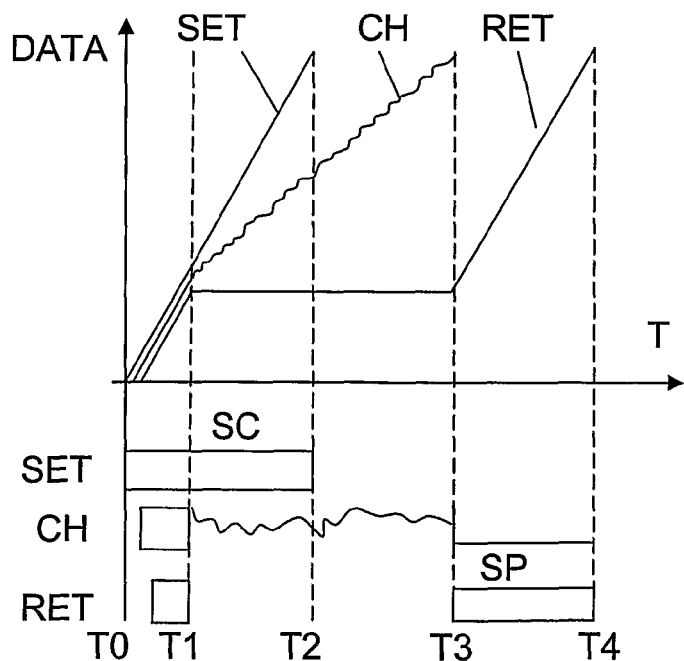

The upper part of FIG. 8 shows the amount of speech data generated by the sending end terminal SET over time, the same speech data transmitted over a communication channel CH over time and played back by the receiving end terminal RET over time. The lower part of FIG. 8 shows when the receiving and sending end terminals RET and SET are active as well as when data is transmitted over the channel CH.

First a normal communication situation prevails. In this situation, which in FIG. 8 starts at time T0, the sending end terminal SET generates speech data at a certain rate, which is transmitted in frames over the channel CH and played back in the receiving end terminal RET after a certain delay. As can be seen from FIG. 8, the data transmission rate over the channel and the reception rate is the same as the data generation rate. However at time T1, the transmission rate of the channel is much lower than the data generation rate and therefore the delay mode is entered. In case the delay mode was entered, which is here shown as occurring at the time T1, the communication mode control unit 36 of the receiving end terminal RET, which was here exemplified by the first mobile station 20, first sends, via the network interface 32 and 34, a reception delay indicator RDI to the sending end terminal SET, which was here exemplified by the second mobile station 22. Thereafter the communication mode control unit 36 of the receiving end terminal RET disables the speech decoder 42, step 62, i.e. it orders it to stop decoding data packets in the receiving buffer 40. This means that the receiving buffer 40 will continue to be filled with speech data, while no speech data are taken away or decoded. This also starts the first time interval AL1, during which the communication mode control unit 36 will inform or alert the user of the receiving end terminal RET of the fact that the delay mode has been entered, step 64. This may be done through making the speaker 28 emit a special sound, for instance a special buzzing sound of a first frequency. This alerting indicates for the user of the receiving end terminal RET that there is information, i.e. speech data, being received from the sending end terminal SET and that the user should refrain from speaking. This may furthermore also be accompanied by the communication mode control unit 36 stopping the speech coder 41 from coding any sounds picked up by the microphone 30. The alerting is in this embodiment continued until the user of the sending end terminal SET stops talking. As the user of the sending end terminal stops talking an end of speech indicator ESI is received from the sending end terminal SET, step 66. The indicator ESI is generated at time T2 and received at time T3. When this end of speech indicator ESI is received the communication mode control unit 36 ends the first time interval AL1 and stops alerting the user of the receiving terminal RET, step 68, and then activates the speech decoder 42, step 70. The speech decoder 42 is thus activated so that it starts decoding the speech data in the receiving buffer 40 and emits sounds SP, via the speaker 28, corresponding to speech provided by the user of the sending end terminal SET until the receiving buffer 40 is emptied, which is at time T4. As the speech decoder 42 is activated, the communication mode control unit 36 also sends a speech decoder active indicator DAI to the sending end terminal SET. The speech decoder 42 of the receiving end terminal RET is thus here disabled during the first time interval AL1, where this first time interval is in this first embodiment the time between the sending of the reception delay indicator RDI and the speech decoder active signal DAI. Here the reception delay indicator RDI and speech decoder active indicator DAI have a higher priority than the speech packets. This means that these indicators can be transmitted faster through the network than the speech packets and in this way the sending end terminal SET can know at what point in time the receiving end terminal RET is only able to listen. From this information the sending end terminal SET can also determine when the user of the receiving end terminal RET has received all of the speech packets and when it is finished processing the received packets. Here it should be mentioned that as an alternative the speech decoder active indicator DAI may also be sent after the last packet has been processed by the speech coder. As a further alternative it is also possible that this indicator is not sent at all. As yet an alternative it is possible to start decoding speech data and emit sounds before receiving the end-of-speech indicator. This may be done if the link quality is predicted to be acceptable in the future.

The operation in the delay mode of the sending end terminal will now be described in more detail with reference also being made to FIG. 6, which shows a flow chart of a number of method steps taken in a method according to the present invention for continuing communication between a sending and a receiving end terminal and being performed in a sending end terminal, which is here assumed to be the second phone 22. The reception delay indicator RDI is here received at time T1 by the communication interface 32 and 34 of the sending end terminal SET and forwarded to the communication mode control unit 36, step 74. The communication mode control unit 36 will then start a second time interval AL2 during which the user of this sending end terminal SET is informed or alerted of the fact that the delay mode has been entered, step 76. The reception of the reception delay indicator RDI also has influence on the determination of a speech coding interval SC. The alerting may here be performed through making the speaker 28 emit a special sound, for instance a special buzzing sound of a second frequency. This alerting indicates for the user of the sending end terminal SET that the user of the receiving end terminal RET is unable to hear the speech of the speech coding interval SC and can at this point in time thus not hear the sound that is spoken and that he/she can therefore not expect to receive speech from the receiving end terminal RET. The user of the sending end terminal SET is therefore allowed to react to this alerting AL2 and can therefore quickly finish the sentence he/she is in the process of uttering. As the last word is uttered, which happens at time T2, the voice detecting unit 46 detects that there is silence and sends a signal to the communication mode control unit 36 indicating that the last word has been uttered. This last utterance also ends the speech coding interval SC. The communication mode control unit 36 generates an end of speech indicator ESI based on this signal and sends it to the receiving end terminal RET, step 78. This indicator ESI is normally not sent with any priority and is thus queued with the outgoing speech packets. Thereafter the communication mode control unit 36 receives the speech decoder active indicator DAI, step 80, which happens at time T3, and based on this it determines an end time for the alerting, step 82. This end time is thus the end of the second time interval AL2. In case the indicator DAI was sent at the activation of the speech decoder 40 in the receiving end terminal RET, the communication mode control unit 34 of the sending end terminal SET may here determine the end time of the second time interval AL2 through adding the duration of the speech coding interval SC to the time of reception of the speech coder active indicator DAI. The start of the speech coding interval SC may here be set as the point in time of the reception of the reception delay indicator RDI by the sending end terminal SET. The second time interval AL2 is thus determined based on the duration of the speech coding interval SC and the duration between the received indicators RDI, and DAI. Also here it is possible that the determination of the second time interval AL2 is based, instead of on the indicator DAI, on some pre-defined, possibly fixed, value or some other indication such as the data transfer rate. This indicator may therefore be omitted. In this way the user of the sending end terminal SET is informed about when the user of the receiving end terminal RET has heard the uttered speech SP.

After the last sound has been decoded by the receiving end terminal, this terminal may again check the link quality and if the link quality is now acceptable, normal duplex operation may be resumed, which may be signalled to the sending end terminal. The users of both the terminals are with advantage in this case also informed of this resumed duplex mode. However, if duplex communication cannot be resumed, the first phone may become a sending end terminal and the second phone may become a receiving end terminal. The user of the first phone may here start talking and upon receiving speech data the new receiving end terminal, i.e. the second phone, will send a reception delay indicator and disable the decoder. Upon the end of utterance by the user of the first terminal, this will send an end-of-speech indicator and the second phone will again enable the decoder upon the reception of the end-of speech indicator. In this way the first and second phones can communicate with each other and switch between acting as sending and receiving end terminals as long as the delay mode exists. It is also possible that the second phone may continue as a sending end terminal after the sending of the end of speech indicator mentioned above, through the user of this second end terminal resuming talking.

It is here possible to also send indicators between the two communication terminals signalling the switch between sending and receiving. There can furthermore be various states defined and signalled, such as the second phone first acting as sender and transferring speech, the first phone listening, the first phone transferring speech, etc.

Here it should also be mentioned that the phone or communication terminal that first determines the delay mode may be the one in control. This means that it is only this one that can order a change of mode. This also means that this terminal, when deciding that the mode is to be changed, will send an indicator of this fact to the other end terminal. As an alternative it is furthermore possible that it is always the phone or communication terminal that acts as a receiving end terminal that can change modes. Here it should be realised that also the entering and leaving of the stretch mode may be signalled in the above described way.

As mentioned above the delay mode can only be left when all necessary steps have been performed. Hence, a link quality check indicating a fair (or better) link quality for a certain duration alone cannot cause the leaving of the delay mode. One essential prerequisite for leaving the delay mode is that the receiving end terminal has played out the buffered speech data. More generally, it may be required that at least a sufficient amount of the buffered speech has been played out up to a certain threshold which is the limit for duplex communication with reasonable communication delay. In order to enhance the communication quality (reduce communication delay), the play out of the buffered speech may occur with time compression of the speech signal, i.e. in a faster pace than original. This is especially advantageous when leaving the delay mode since it allows leaving the delay mode even with a relatively high amount of speech left in the buffer. It should be highlighted though that time compression during play out of the buffered speech is also advantageous when staying in the delay mode since even in this situation it helps keeping the communication delay as small as possible.

As indicated above the decoder active indicator can be omitted. In this case the second interval may be set to end with the reception of speech data from the former receiving end terminal. The user of the second phone may then normally resume talking after having received and played speech data sent from the first phone as a response. In case the user of the second phone would speak again before previously transmitted speech data has been played by the first phone, it is here possible that the first phone, i.e. the receiving end terminal, would provide a new reception delay indicator, for indicating to the user of the sending end terminal, i.e. the second phone, that the receiving end terminal is in the delay mode. As the receiving end terminal receives this new speech data it may then inserts a pause between the previous speech data and the new speech data.

With the present invention it is possible to continue communicating between two end terminals even though the link between them is weak. This is according to the present invention solved through providing a Push-to-Talk mode, i.e. a simplex communication mode, based on the detecting of the weak link in the network. Thus each user may here be allowed to talk in turns, while retaining the connection. This has the advantage of allowing the end users to decide if the call is to be ended when the link is weak as opposed to being forced by the network. Another advantage is that since speech is buffered until all packets have been received, it is possible to provide improved processing of the speech so that there are no errors. It is thus possible to provide for instance resending of erroneous packets or error correction codes, since a constant delay is no longer an issue. This means that the sound emitted will be "clean". This is often not possible in a real-time situation of the normal mode.

In case the transition to the delay mode is abrupt, i.e. is performed in the middle of a sound, word or sentence, it may be difficult for the user of the receiving end terminal to understanding the context in which buffered speech being played has been uttered. It is therefore of interest to provide a more graceful change of mode for the users. One way to provide a smooth transition to the delay mode is to use the recording unit 44 of FIG. 3. The speech decoder 42 can detect pauses or silent periods in the decoded speech packets, for instance through investigating their energy content. Each time that it detects a pause or silent period it then notifies the communication mode control unit 36. This unit 36 then orders the recording unit 44 to record the sound being output to the speaker 28, where a new recording is started for a newly detected pause and old recordings are discarded. When the delay mode is then entered, the speech decoder 42 of the receiving end terminal continues processing data packets until it again determines that there is a pause. Thereafter processing is stopped until the end of speech indicator is received. However since the recording unit 44 also records the sound between the previous pause and this last pause, this recorded sound can be put to use. When the communication mode control unit 36 therefore receives the end of speech indicator, it starts by ordering the recording unit 44 to play the stored sound and thereafter ordering the speech decoder 42 to decode the speech packets in the receiving buffer 40 after this recorded sound has been played. In this way it is possible for the user of the receiving end terminal to better understand the speech that is buffered up during the delay mode. As an alternative it is possible that silence is detected in the sending end terminal and no speech packets with silence are sent. Instead data packets indicating that a pause should be inserted between speech packets may be sent from the sending end terminal. These indicators may then be used by the communication mode control unit in order to determine when the recording unit is to start and end recording.

The various indicators sent above can be sent in a special signalling channel or can be provided in a traffic channel but with higher priority.

The invention was above being described as method and devices for continuing communication between a first and a second communication terminal normally engaged in duplex communication and provided in the communication terminals, i.e. in the mobile stations. It is equally as well possible to provide these methods and devices in the network, for instance in a base station or in an RNC. A device according to the present invention can therefore be a base station or an RNC instead of a communication terminal. The communication mode control unit of the present invention is then preferably provided in one such entity for each mobile station. Alternatively there may be one single entity in the network handling both the receiving and sending end terminal. In case the invention is provided in the network, the communication mode control unit would be provided in the network and this entity would receive signals from the corresponding end terminal regarding determined link quality, pause packets and end of speech indicator and then provide indications to the users of the end terminals of the delay mode though sending orders to the end terminals to indicate the mode to the users and to buffer packets.

The detecting of the low link quality was above being described as performed at the first communication terminal that is acting as a receiving end terminal. However, it should be realised that it may just as well be performed in the sending end terminal in that the communication mode control unit of this terminal may detect that coded speech is provided to the output buffer at a rate that the channel does not support. This detection can also be made in the network entity, for instance in a base station or an RNC, which may then detect that the channel does not support the lowest coding rate.

It should also be realised that the alerting is not limited to sound but can be provided using also visual indications or even vibrations. These types of alertings may furthermore be combined.

The stretch mode may be entered in other ways. It may be entered as a temporary measure as a consequence of the link quality falling below the first threshold. This mode will then transfer into the delay mode in case the link quality does not improve over time. In this case it is also possible that there is no transition from the delay mode back to the stretch mode, but directly into the normal mode in case the link quality is again acceptable. In the description that was made above speech data was in the form of packets. It should however be realised that the present invention is not limited to data packets but can be applied on for instance speech data in time slots.

The communication mode control unit is preferably provided in the form of one or more processors with corresponding memory containing the program code for performing the functions of this unit. This program code can also be provided on one or more computer program products such as a CD ROM disc, which will perform the invention when loaded into a device having suitable processing capabilities. Naturally other types of products can be provided for this, like for instance a removable memory like a memory stick. The computer program product can also be provided as software, which is downloaded remotely from a server either outside or inside the cellular network or be downloaded via a computer like a PC to which a mobile station is temporarily connected.

Although the present invention has been described in connection with specific embodiments, it is not intended to be limited to the specific form set forth herein. Rather, the scope of the present invention is limited only by the accompanying claims.

The invention claimed is:

1. A method for continuing communication between a first communication terminal and a second communication terminal normally engaged in duplex communication, when a link between the two communication terminals is weak, said method comprising:
   entering a delay mode involving simplex communication, in response to detecting that a quality of the link is lower than a first threshold;
   providing an indication for a user of the first communication terminal acting as a receiving end terminal in the delay mode; and
   entering a stretch mode prior to entering the delay mode, said stretch mode comprising the step of ordering a speech decoder to stretch a speech signal of decoded speech data.

2. The method of claim 1, where said delay mode comprises the further steps of:
   providing a reception delay indicator for the second communication terminal, acting as a sending end terminal in the delay mode;
   disabling a speech decoder of the receiving end terminal from decoding received speech data during a first time interval, where the start of the first time interval is associated with detecting the low link quality;
   receiving, from the sending end terminal, an end of speech indicator and using this end of speech indicator to define the end of the first time interval; and
   activating the speech decoder for decoding speech data after the first time interval.

3. The method of claim 2, where said delay mode comprises the further step of providing a speech decoder active indicator for the sending end terminal in relation to the speech decoder being active after the first time interval.

4. The method of claim 2, wherein the step of disabling the speech decoder comprises disabling the speech decoder at a silence period detected after the quality of the link fell below the first threshold.

5. The method of claim 2, further comprising the step of replaying previously played speech data starting from a silence period detected before the quality of the link fell below the first threshold.

6. The method of claim 2, wherein the reception delay indicator has a higher priority than the speech data.

7. The method of claim 2, further comprising the step of leaving the delay mode based on detecting at the receiving end terminal that the quality of the link is above the first threshold.

8. The method of claim 7, wherein the step of leaving the delay mode is performed after speech data received and buffered during the first time interval have been decoded and played, until a threshold has been reached that is the limit for duplex communication.

9. The method of claim 2, wherein the reception delay indicator corresponds to the start of a speech coding interval at the sending end terminal and the end of speech indicator corresponds to the end of the speech coding interval and further comprising the step of determining a second time interval based on the duration of a speech coding interval, where a user of the sending end terminal cannot expect speech from the receiving end terminal during the second time interval.

10. The method of claim 1, wherein entering the stretch mode is based on detecting at the receiving end terminal that the quality of the link is lower than a second threshold, where the second threshold is higher than the first threshold.

11. The method of claim 1, further comprising the step of leaving the stretch mode based on detecting at the receiving end terminal that the quality of the link is higher than the second threshold.

12. A device for continuing communication between a first communication terminal and a second communication terminal normally engaged in duplex communication, when the link between the two communication terminals is weak, said device comprising:
a network interface associated with a communication network; and
a communication mode control unit configured to:
enter a delay mode involving simplex communication based on detecting of a quality of the link being lower than a first threshold;
provide an indication for a user of the first communication terminal acting as a receiving end terminal of the delay mode; and
enter a stretch mode prior to entering the delay mode, said stretch mode comprising ordering a speech decoder to stretch a speech signal of decoded speech data.

13. The device of claim 12, wherein said communication mode control unit when entering the delay mode is further configured to:
provide a reception delay indicator for the second communication terminal which is to act as a sending end terminal;
disable a speech decoder of the receiving end terminal from decoding received speech data during a first time interval, where the start of the first time interval is associated with the point in time of the detected low link quality;
receive an end of speech indicator from the sending end terminal and use this end of speech indicator to define the end of the first time interval; and
activate the speech decoder for decoding speech data after the first time interval.

14. The device of claim 12, wherein the device is provided as a device in the communication network.

15. The device of claim 12, wherein the device is one of the communication terminals and further comprises a user interface, where said communication mode control unit is further configured to inform the user of the receiving end terminal of the delay mode via the user interface.

16. A method for continuing communication between a first communication terminal and a second communication terminal normally engaged in duplex communication, when the link between the two communication terminals is weak, characterized by the steps of:
entering a delay mode involving simplex communication, based on detecting that a quality of the link is lower than a first threshold;
providing an indication for a user of the second communication terminal acting as a sending end terminal of the delay mode; and
entering a stretch mode prior to entering the delay mode, said stretch mode comprising the further step of ordering a speech decoder to stretch a speech signal of decoded speech data.

17. The method of claim 16, wherein said delay mode comprises the further steps of:
receiving a reception delay indicator associated with the receiving end terminal, which indicator corresponds to the start of a speech coding interval; and
providing an end of speech indicator for the receiving end terminal corresponding to the ending of the speech coding interval in the sending end terminal.

18. The method of claim 17, further comprising the step of determining a second time interval based on the duration of the speech coding interval at the sending end terminal, during which second time interval a user of the second communication terminal, which is to act as a sending end terminal, cannot expect speech from the receiving end terminal.

19. The method of claim 18, further comprising the step of receiving a speech decoder active indicator from the receiving end terminal and basing the determination of the speech coding interval also on the speech decoder active indicator.

20. A device for continuing communication between a first communication terminal and a second communication terminal normally engaged in duplex communication, when the link between the two communication terminals is weak, said device comprising:
a network interface associated with a communication network; and
a communication mode control unit configured to:
enter a delay mode involving simplex communication based on detecting that a quality of the link is lower than a first threshold;
provide an indication for a user of the second communication terminal acting as a sending end terminal of the delay mode; and
enter a stretch mode prior to entering the delay mode, said stretch mode comprising the further step of ordering a speech decoder to stretch a speech signal of decoded speech data.

21. The device of claim 20, wherein the communication mode control unit is further configured to:
receive a reception delay indicator associated with a first communication terminal acting as a receiving end ter minal, which indicator corresponds to the start of a speech coding interval; and provide an end of speech indicator for the receiving end terminal corresponding to the ending of the speech coding interval in the sending end terminal.

22. The device of claim 20, wherein the device is provided as a device in the communication network.

23. The device of claim 20, wherein the device is one of the communication terminals and further comprising a user interface, where said communication mode control unit is further configured to inform the user of the sending end terminal of the second time interval via the user interface.

* * * * *

UNITED STATES PATENT AND TRADEMARK OFFICE
CERTIFICATE OF CORRECTION

PATENT NO. : 8,380,525 B2  Page 1 of 1
APPLICATION NO. : 12/666203
DATED : February 19, 2013
INVENTOR(S) : Almgren et al.

Figure 6:
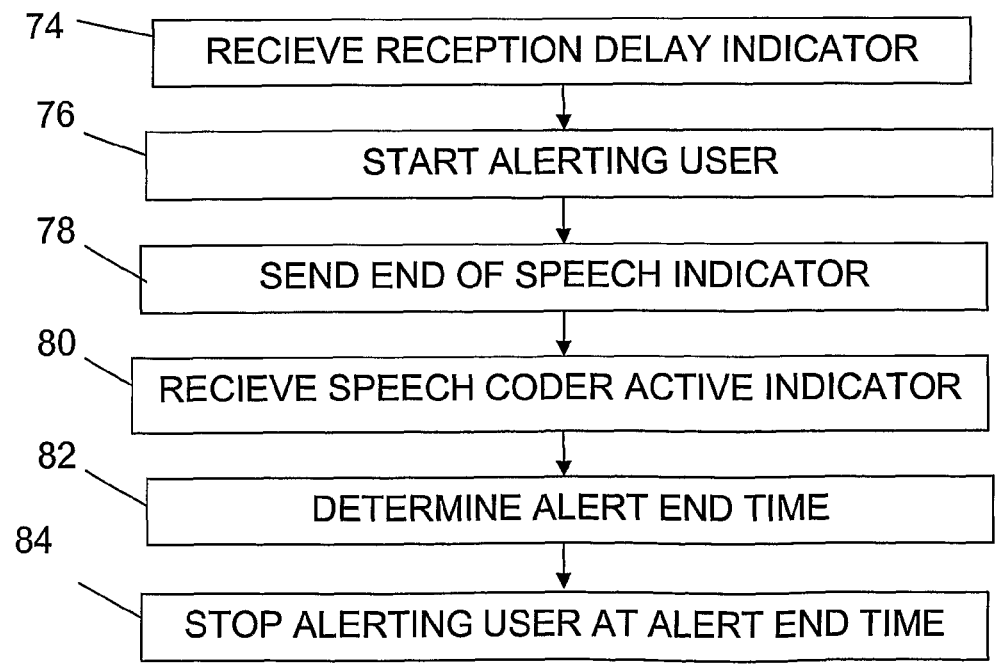
FIG. 6 shows a flow chart of a number of method steps taken in a method according to the present invention for continuing communication between a sending and a receiving end terminal and being performed in a sending end terminal, FIG. 7 schematically shows speech being received from one user at a sending end terminal and played for a user of a receiving end terminal together with different indicators sent between these end terminals, and FIG. 8 schematically shows data generated by a sending end terminal, received by a receiving end terminal as well as being transmitted over a channel.

It is certified that error appears in the above-identified patent and that said Letters Patent is hereby corrected as shown below:

In the Drawings:

In Fig. 6, Sheet 3 of 4, for Tag "74", delete "RECIEVE" and insert -- RECEIVE --, therefor.

In Fig. 6, Sheet 3 of 4, for Tag "80", delete "RECIEVE" and insert -- RECEIVE --, therefor.

In the Specifications:

In Column 1, Line 11, delete "communication" and insert -- communication, --, therefor.

In Column 1, Line 22, delete "In" and insert -- In a --, therefor.

In Column 1, Line 26, delete "quality" and insert -- quality) --, therefor.

In Column 8, Line 64, delete "emit" and insert -- emits --, therefor.

Signed and Sealed this
Twenty-eighth Day of May, 2013

Teresa Stanek Rea
*Acting Director of the United States Patent and Trademark Office*